United States Patent
Acosta

(10) Patent No.: US 10,652,763 B2
(45) Date of Patent: May 12, 2020

(54) CELLULAR PHONE MESSAGE DELIVERY TESTING SYSTEM AND METHOD

(71) Applicant: TelIntel Ltd., Weston, FL (US)

(72) Inventor: Mario Acosta, Weston, FL (US)

(73) Assignee: TelIntel Ltd., Weston, FL (US)

( * ) Notice: Subject to any disclaimer, the term of this patent is extended or adjusted under 35 U.S.C. 154(b) by 0 days.

(21) Appl. No.: 15/802,027

(22) Filed: Nov. 2, 2017

(65) Prior Publication Data

US 2018/0124615 A1 May 3, 2018

Related U.S. Application Data

(63) Continuation-in-part of application No. 14/311,797, filed on Jun. 23, 2014, now abandoned.

(60) Provisional application No. 61/838,946, filed on Jun. 25, 2013.

(51) Int. Cl.
| | |
|---|---|
| *H04W 24/02* | (2009.01) |
| *H04L 12/26* | (2006.01) |
| *H04W 4/14* | (2009.01) |
| *H04M 15/00* | (2006.01) |
| *H04L 12/24* | (2006.01) |
| *H04W 24/06* | (2009.01) |
| *H04L 12/58* | (2006.01) |

(52) U.S. Cl.
CPC ......... *H04W 24/02* (2013.01); *H04L 41/5009* (2013.01); *H04L 43/045* (2013.01); *H04L 43/50* (2013.01); *H04M 15/51* (2013.01); *H04M 15/58* (2013.01); *H04M 15/8221* (2013.01); *H04W 4/14* (2013.01); *H04W 24/06* (2013.01); *H04L 43/0858* (2013.01); *H04L 51/30* (2013.01)

(58) Field of Classification Search
CPC ....... H04W 24/02; H04W 24/06; H04W 4/14; H04L 43/0858; H04L 51/30
See application file for complete search history.

(56) References Cited

U.S. PATENT DOCUMENTS

| | | | | |
|---|---|---|---|---|
| 6,119,014 | A * | 9/2000 | Alperovich | H04L 51/38 340/7.39 |
| 2002/0187794 | A1* | 12/2002 | Fostick | H04L 51/38 455/466 |
| 2005/0192899 | A1* | 9/2005 | Reardon | G06Q 20/10 705/40 |

(Continued)

*Primary Examiner* — Ankur Jain
*Assistant Examiner* — Fatuma G Sherif
(74) *Attorney, Agent, or Firm* — Quinn IP Law

(57) ABSTRACT

A process for determining an operational status for a cellular service vendor includes, within a computerized device, sending a test signal comprising a test message to each of a plurality of testing nodes, each testing node being associated with a different cellular service vendor and each testing node including a computerized application configured to provide data back to the computerized device in reply to the test signal independently from data provided by the associated cellular service vendor. The process further includes, within the computerized device, determining a quality of service for each of the cellular service vendors based upon the data provided by the computerized application, generating a computerized display output describing the quality of service for each of the cellular service vendors, and allocating marketing resources based upon the quality of service for each of the cellular service vendors.

11 Claims, 6 Drawing Sheets

(56) References Cited

U.S. PATENT DOCUMENTS

| | | | | |
|---|---|---|---|---|
| 2006/0148496 | A1* | 7/2006 | Zhu | H04M 1/72552 455/466 |
| 2009/0177555 | A1* | 7/2009 | Milgrom | G06Q 30/0601 705/26.1 |
| 2011/0223945 | A1* | 9/2011 | Bhatnagar | H04L 51/14 455/466 |

* cited by examiner

CELLULAR PHONE MESSAGE DELIVERY TESTING SYSTEM AND METHOD

CROSS REFERENCE TO RELATED APPLICATIONS

This disclosure is a continuation-in-part of U.S. patent application Ser. No. 14/311,797 filed on Jun. 23, 2014 which claims the benefit of U.S. Provisional Application No. 61/838,946 filed on Jun. 25, 2013, both of which are hereby incorporated by reference.

TECHNICAL FIELD

This disclosure is related to a method to remotely test function of a cellular network. In particular, this disclosure is related to a system and method where remotely located cellular devices can be utilized to provide active message delivery feedback to a centralized testing module in real-time.

BACKGROUND

The statements in this section merely provide background information related to the present disclosure. Accordingly, such statements are not intended to constitute an admission of prior art.

Cellular devices communicate with cellular communications networks, such that data including voice communication, text messages, and other graphical and/or audio content can be transferred over the networks. A short message service (SMS) messages or text messages are used to communicate messages to a user of a cellular device.

A cellular communications network can include a client switch receiving information and transmitting that information to any of a number of cellular service vendors that provide connections from the cellular communications network to individual consumers. In one exemplary transaction, a message can originate at one person's device and be sent to a server. The server can communicate the message to a cellular communications network. Based upon a destination associated with the message, the message is routed by a client switch to a particular vendor, which locates the intended recipient's device and delivers the message to that device. The same transaction can be operated in reverse. A number of variations of such a process to generate, send, and deliver a message are known in the art and will not be described in detail herein.

SMS messages can be used in advertising and marketing, for example, with a company paying to have a number of messages sent to a group of consumers. Efficacy of a SMS messaging marketing campaign can depend upon a number of factors. One factor includes proper operation of the communications network, the vendors, and successful delivery of the message to the intended consumer recipients.

U.S. Patent Application No. 2011/0223945 A1, herein "Bhatnagar," discloses a system to send a text message to one a plurality of users based upon their geographical location. Bhatnagar, in FIGS. 3-7 and related discussion, is focused upon converting the message into a particular format for each of the service providers in each of the geographical areas. The Bhatnagar device is disclosed to be able to send the marketing message, including a graphical user interface that shows a user different vendors/suppliers for a particular geography and allows the user the ability to select the supplier of their choice to send the SMS message. Bhatnagar does not disclose certifying the operational status of each cellular service vendor based upon a received status confirmation. Bhatnagar does not disclose generating a computerized display output describing the operational status of each of the cellular service vendors. Bhatnagar does not disclose allocating marketing resources based upon operational status for each of the cellular service vendors.

U.S. Pat. No. 6,119,114, herein "Alperovich," discloses an SMS messaging system. According to the disclosure, a system includes a way to schedule sending an SMS message according to priorities set by the sender. It also allows the receiver to sort these messages according to the priorities set by the sender.

Both Alperovich and Bhatnagar rely on performance of the mobile network operator to function and confirm the delivery of the SMS message and would have no indication whether their service was not working correctly due to bad performance from their supplier. Both fail to provide the necessary statistics required to monitor performance and determine a descriptive quality of service for particular service vendors.

SUMMARY

A process for determining an operational status for a cellular service vendor includes, within a computerized device, sending a test signal comprising a test message to each of a plurality of testing nodes, each testing node being associated with a different cellular service vendor and each testing node including a computerized application configured to provide data back to the computerized device in reply to the test signal independently from data provided by the associated cellular service vendor. The process further includes, within the computerized device, determining a quality of service for each of the cellular service vendors based upon the data provided by the computerized application, generating a computerized display output describing the quality of service for each of the cellular service vendors, and allocating marketing resources based upon the quality of service for each of the cellular service vendors.

BRIEF DESCRIPTION OF THE DRAWINGS

One or more embodiments will now be described, by way of example, with reference to the accompanying drawings, in which.

DETAILED DESCRIPTION

Figure 1:
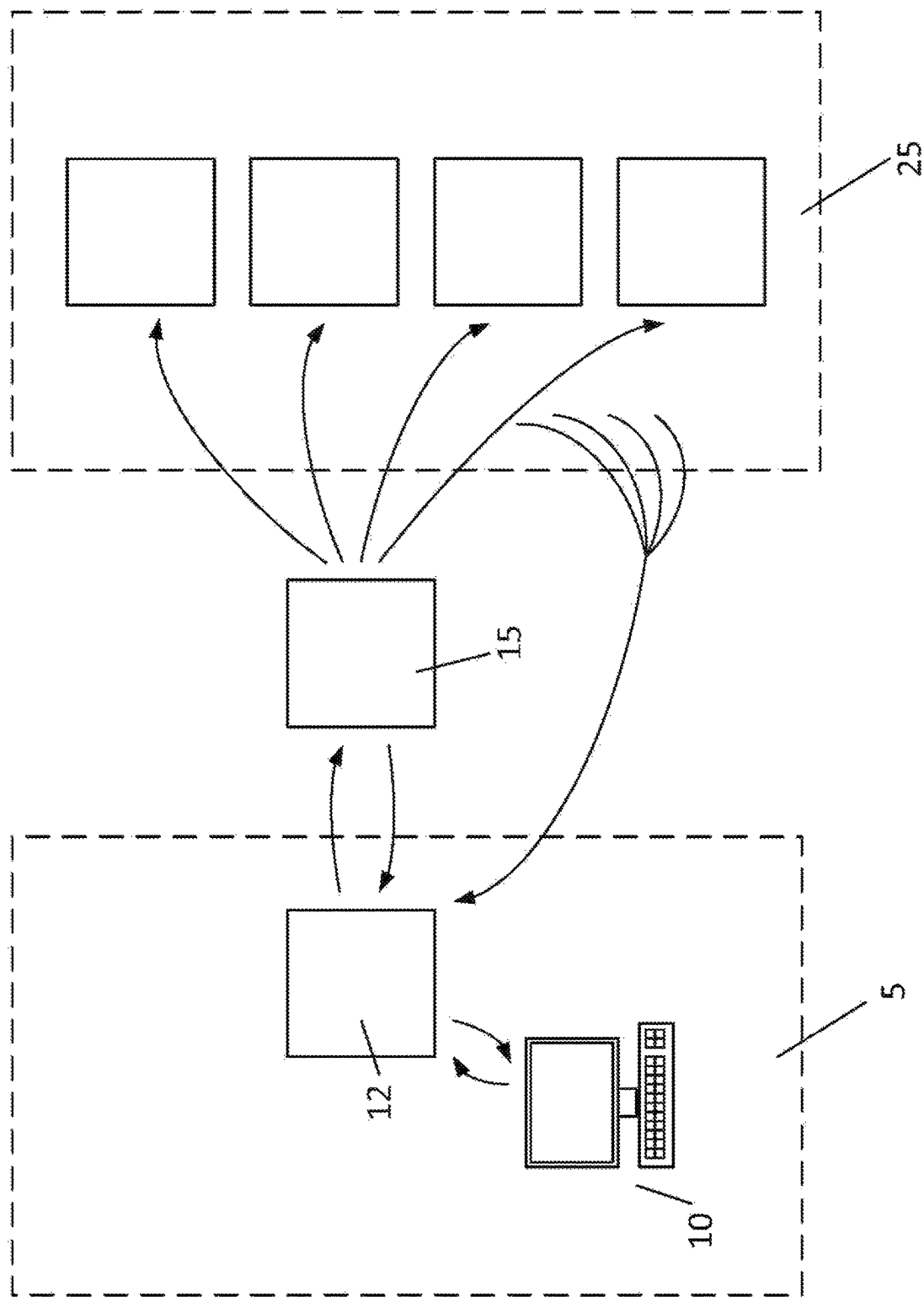
FIG. 1 illustrates an exemplary short message service message transaction useful to confirm delivery of the message to a number of intended recipients, in accordance with the present disclosure.

Known SMS systems can permit a user to select between various cellular service vendors based upon geographic parameters or other static details. No system provides for real-time reporting of a current quality of service for each of a plurality of cellular service providers, enabling a user to selectively allocate marketing resources in the form of paid SMS messages based upon the current quality of service for each provider.

A disclosed SMS system enables measuring or determining quality of service provided by a plurality of cellular service vendors in real-time. A test message can be sent out to a plurality of test nodes operated among the plurality of cellular service vendors. A cell phone application can be distributed that automatically and independently provides confirmation of receipt of a test message. In addition, statistics can be provided or measured that include but are not limited to delay of receipt of the message, changes in sender identification information, and fake delivery reports. The confirmed receipts can be used to determine quality of service for each of the cellular service vendors. A user can selectively allocate marketing resources in the form of paid SMS messages based upon the current quality of service for each provider. The disclosed system does not rely on the information and statistics provided by the mobile network operator but rather uses its own statistics collected through the application to compare with those provide by the vendors and measure the real performance of the SMS.

In one embodiment, the system includes a testing platform that consists of a cloud portal from where users can submit SMS and testing nodes which are telephonic handsets running a computerized application to read and interpret the incoming SMS and then transmit results back to the system via data, e.g. the Internet.

The results analyzed to determine the quality of service can include delivery of the SMS, delay, delivery report given by the provider, changes in content, changes in sender ID and identification of the short message service center (SMSC) which identifies whether the delivery of the SMS message was done via a local number or a foreign number (i.e. global title.)

For carriers or aggregators or any company using multiple vendors to provide SMS delivery anywhere in the world face the challenge of not knowing how that service is performing, to the point that they might not even know if the SMS was delivered correctly. Additionally, confirmations of delivery are provided optionally by the service vendor. Many service vendors do not provide delivery confirmations. The disclosed system offers a user or a company intending to send out marketing SMS messages an ability to distribute and operate applications on handsets independently of service vendors providing delivery confirmations. The disclosed system enables users to test their suppliers and compare the results provided to determine if the performance is up to standards and then send their production traffic with a higher degree of trustworthiness.

In the following description, numerous specific details are set forth in order to provide a thorough understanding of the present disclosure. It will be apparent, however, to one having ordinary skill in the art that the specific detail need not be employed to practice the present disclosure. In other instances, well-known materials or processes have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Short message service messages provide an inexpensive and effective way for a company desiring to advertise to send advertising to large groups of consumers. An advertising company can provide a marketing campaign including sending an advertising campaign to a group of consumers or an identified list of consumers, with exemplary terms of such a campaign including sending one million messages for a negotiated amount of money. If all of the messages sent by the advertising company are successfully delivered to consumers, the campaign can be effective in providing new customers to the company paying for the campaign. If none or few of the messages actually reach the consumers, the campaign will be ineffective and the money spent on the campaign is wasted.

SMS messages or text messages can be sent to groups of consumers blindly, assuming that all or most of the messages will reach the intended recipients. Such an assumption can be true. However, connectivity issues known in the art can arise that cause failure of the messages to be received. However, conditions interfering with proper operation and delivery of messages though a particular vendor can vary and cause intermittent operation of the vendor's network. Mobile Operator Filtering can block SMS coming from a specific sender, to a particular number, or with a particular content. A storm or other problem can cause part of a vendor's network to be inoperative. Intermittent power grid problems or over-utilized or otherwise problematic wireless infrastructure can prevent a message from being received by the desired user. In light of unreliable wireless messaging, one strategy that advertising or communications companies could adopt is to place personnel in different regions of a network's coverage. A test message can be sent to each of the personnel, and the personnel can report back whether the message was correctly received. Such a strategy can be expensive, unreliable depending upon the personnel, and can include a delay inherent to the person needing to communicate the report back and have the report be processed to the person running the test.

One reaction to such problems can be for companies to direct paid messages only to reliable networks that are most frequently effective and avoid spending money on campaigns directed as less reliable networks. However, such a strategy can cause some consumers to receive many messages, causing those consumers to be less responsive to individual messages, and the strategy can cause other consumers to be under-served by the advertising messages, creating a population that fails to receive marketing from many companies. A marketing opportunity exists to find ways to test networks and determine a marketing distribution strategy based upon confirmed connectivity of the tested networks.

Similarly, in addition to mere connectivity, functionality of services upon a network can vary and be a factor in affectivity of a message campaign upon the network. For example, calling line identification (CLI) service provides a user receiving a message caller identification or caller ID information for a sender of the message. Correct and consistent delivery of the calling party's telephone number or caller ID information to the user receiving the message is of great importance to mobile and fixed operators. Similarly, a telemarketing campaign can be more successful if caller ID information is provided to a user being called. Lack of correct CLI-delivery means revenue loss and poor service for several reasons. Testing has shown that users more frequently tend to answer a call when caller ID information is available. Further, missed calls where no caller ID information is associated cannot be called back. Further, many mobile services (e.g. voice mail) require CLI delivery to work. In addition to typical user reactions and call back potential enabled and encouraged by caller ID information being delivered to a user's phone, active applications upon a smartphone can further enhance functionality of marketing messages or phone campaigns. For example, advertising company A can negotiate having an application loaded onto phones operated by networks B, C, and D, such that whenever a message is received by one of the phones with caller ID information from company A, a unique computerized response can be generated on the phone drawing attention to the message. A marketing opportunity exists to find ways to test networks and determine a marketing distribution strategy based upon operation of a CLI service on the tested networks.

Similarly, testing of international top-ups for a network or a series of networks can be used to improve affectivity of a marketing campaign. Top-ups refer to the service of purchase credit for a mobile phone service. International top-up refers to the ability to purchase credit in one country for the service of a mobile phone in another country. International top-up operators make money on the international currency exchange. The international top-up resellers need a way to verify which operator is offering the best currency exchange to every country so they can offer better service to their clients or make more money. A process as disclosed herein can test various top-up options for a network to minimize cost and/or maximize a number of paid messages that can be sent for a set budget. A lowest cost top-up option can be selected for a particular network. A threshold top-up cost can be used to compare various networks, for example, only allocating portions of an advertising campaign to a portion of the networks that include top-up costs below the threshold. In another example, a network can be monitored over time, and marketing resources can be allocated to the network if variable top-up costs fall below a threshold cost. The top-up cost can be used as part of an algorithm, allocating different portions of a budget to networks based upon top-up cost, for example, allocating 80% based upon lowest top-up costs and allocating 20% to networks with high top-up costs but with attractive other variables, such as network reliability, desirable demographics in the customer users, and high historical rates of customer response. A marketing opportunity exists to find ways to test networks and determine a marketing distribution strategy based upon real-time top-up cost testing on the tested networks.

A status confirmation for a vendor network or a series of networks can be useful in a wide variety of applications. For example, a vendor status confirmation can be used to deliver paid SMS messages providing advertising or marketing to the consumers. In another example, an SMS message can be used for authentication purposes, for example, providing identity controlled access to a bank account. In another example, an SMS message can be used for user verification purposes, for example, by sending a message with a verification code which has to be entered to complete an online transaction or registration. In another example, an SMS message can be used for confirmation purposes, for example, by sending a message confirming completion of a task initiated in another medium such as an online transaction. In another example, an SMS message can be used for notification purposes, for example, by sending a message reminding a user that a library book is overdue or notifying a customer at a restaurant that her or his table is ready. Such messages used for authentication, confirmation, or notification can be time dependent. An online banking transaction requiring authentication can fault out for time if the message is not received by the user within a time period. A user may call a company to attempt to receive confirmation that a transaction was completed if a message is not received in a timely fashion. If a customer fails to receive notification that her or his table is ready, the customer may become dissatisfied and have a bad experience or an leave the restaurant. Vendor status confirmation can be used to augment SMS messages used for authentication, confirmation, or notification, for example, ensuring that a currently most reliable vendor network is used to send the SMS message. Such a vendor status confirmation can include confirming connectivity of the network, operation of a calling line identification function or operation of a similar function upon the network, checking top-up rates and using the information to select a network or top-up service, or any other network status that is a factor for affectivity of advertising sent provided over wireless devices. Throughout the disclosure, examples are provided wherein using vendor status confirmation is useful for advertising or marketing purposes. The disclosure is intended to apply such examples to all possible uses for SMS messages, including but not limited to SMS messages used for authentication, confirmation, and notification.

Cellular devices can be equipped with programming to confirm delivery of a message. Exemplary Android™ and iPhone/iOS devices can be configured to confirm delivery of an SMS message or send a message confirming delivery of the message to the sender. Any device including the configurations disclosed herein can be utilized. Such a confirmation can be generated and sent without interaction from a user of the cellular device. In one embodiment, the device can be configured to receive a designated test message and confirm delivery of the test message without any perceivable audio or graphical indication to the user of the device.

A test SMS message is one example of a test signal that can be used to generate a confirmation message from a test node. In addition to test messages, test signals of different types can be used to provide a real-time status of a network as disclosed herein. A test signal can be sent over a voice network, for example to test features associated with voice calls. In another example, a test notification can be sent as a test signal. Throughout the disclosure, wherever a test message is disclosed, it is understood that any type of test signal known in the art can be used to generate confirmation signal from a test node.

A process to use a test signal to confirm in real-time a status of a vendor is disclosed. Such a process can be used for a number of different messaging processes, for example, including selectively sending paid advertising messages through a vendor based upon the confirmed status. By enabling confirmation of the status of a vendor and rapidly thereafter sending the paid messages through the vendor, the chances of wasted advertising caused by the sent messages not reaching the consumers as a result of inoperative messaging service are reduced or eliminated. Such a process can be used for multiple vendors at once, and an advertising campaign can be directed to only the operative vendors, for example, with an allotted number of paid messages being distributed over all available vendors at an instant that the vendors are tested. In another embodiment, vendors can be queued, with messages being sent immediately to any vendors with a confirmed operational status, and with messages being queued for later delivery for vendors that fail the original confirmation, with the later delivery being initiated as later test messages are sent and the statuses confirmed. A number of variations of marketing campaigns that are enabled by real-time confirmation of a vendor's status are envisioned, and the disclosure is not intended to be limited to the particular examples provided herein.

According to one embodiment of the disclosure, a process for determining an operational status for a cellular service vendor includes, in a computerized device, sending a test signal comprising a test message to each of a plurality of testing nodes, each testing node being associated with a different cellular service vendor and each testing node being configured to provide a status confirmation in reply to the test message independently from data provided by the associated cellular service provider. The process further includes, in the computerized device, certifying the operational status of each of the cellular service vendors based upon the status confirmations, the operational status comprising one of operating normally and failing to operate normally. The process further includes generating a computerized display output describing the operational status of each of the cellular service vendors. The process further includes allocating marketing resources based upon the certifying, the allocating comprising directing paid messages only to the cellular service vendors with the operational status of operating normally.

FIG. 1 illustrates an exemplary short message service message transaction useful to confirm delivery of the message to a number of intended recipients. A TestMySMS system 5 is illustrated, including a workstation 10 and a server 12 connected to the workstation. A communications network 15 is illustrated including a client switch configured to route messages over the network to any of a number of vendors. Testing nodes 25 are illustrated including at least one cellular device connected to each of the mobile networks where the vendors need to be tested. Any of the cellular devices are enabled to send a communication back to the TestMySMS system 5, including a confirmation that a message was received. Variations on operation of a network enabling delivery and confirmation of a test message are envisioned, and the disclosure is not intended to be limited to the examples provided herein.

Figure 2:
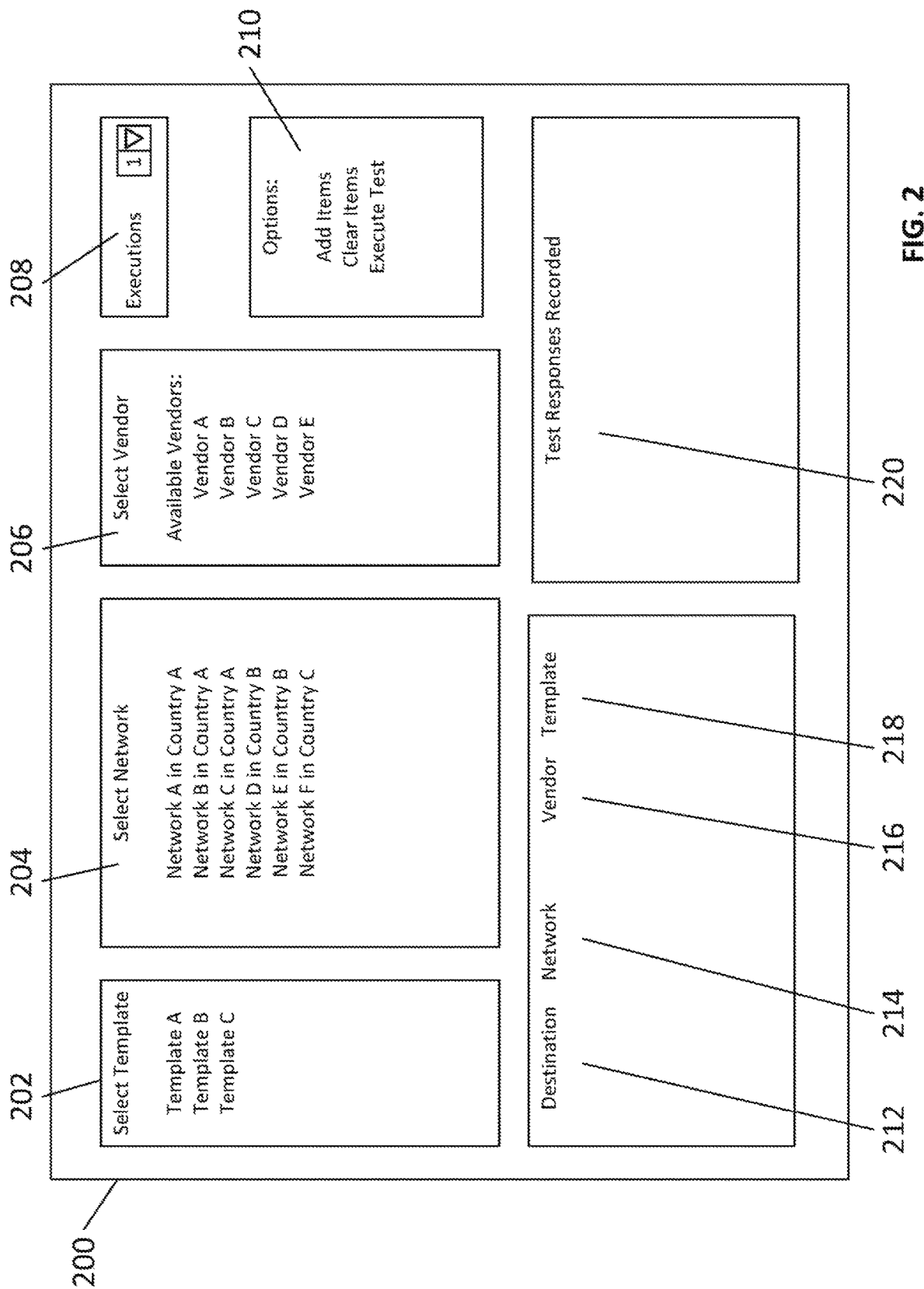
FIG. 2 illustrates an exemplary graphic display illustrating operation of a program configured to send short message service test messages to a plurality of vendors, in accordance with the present disclosure.

FIG. 2 illustrates an exemplary graphic display illustrating operation of a program configured to send short message service test messages to a plurality of vendors. Display 200 includes a number of elements permitting selection of test message parameters, operation of a test message system, and monitoring results of test messages in the form of confirmed statuses of testing nodes and/or particular vendors. Element 202 permits the user to select test message system templates, for example, saved to permit quick operation of pre-configured tests. Element 204 permits the user to select between available communications networks, for example, based in different countries. Element 206 permits the user to select between available vendors for a particular network. Element 208 permits the user to select a number of test executions, for example, permitting iterative operation of a test. Element 210 includes buttons permitting the user to modify operation of the test or execute the test. Elements 212, 214, 216, and 218 include a list of vendor details location, network name, vendor name, and message template name, respectively. Element 220 provides details of the message sent. Element 206, 216, 220, or any other part of display 200 can include feedback providing a confirmed status of any or all of the vendors. In one embodiment, a separate test results display can be utilized to provide the status of each of the vendors tested. In one embodiment, a message including one of "OK," "PENDING," or "FAILED" can be used to quickly convey a status of a vendor being testing. In one embodiment, the messages can be associated with a color, green, yellow, and red, respectively, to quickly convey the status of each vendor. A refresh button can be provided to permit easy updating of information over time or over iterative tests. In one embodiment, the results will periodically automatically update. In one embodiment, the testing can continue through a time period, and the display can be cycled to show the ongoing statuses of each of the vendors. The illustrated display 200 includes elements required to operate a test message system. Additional elements could be integrated into the display permitting operation of a corresponding advertising campaign, for example, permitting allocation of an allotted number of messages to each of a number of selected vendors. According to one embodiment of the display, column widths, element content, or other details can be manually configured by the user. A number of display elements or arrangements are envisioned enabling operation of a test message system and/or a corresponding advertising according to the methods disclosed herein, and the disclosure is not intended to be limited to the examples provided herein.

Figure 3:
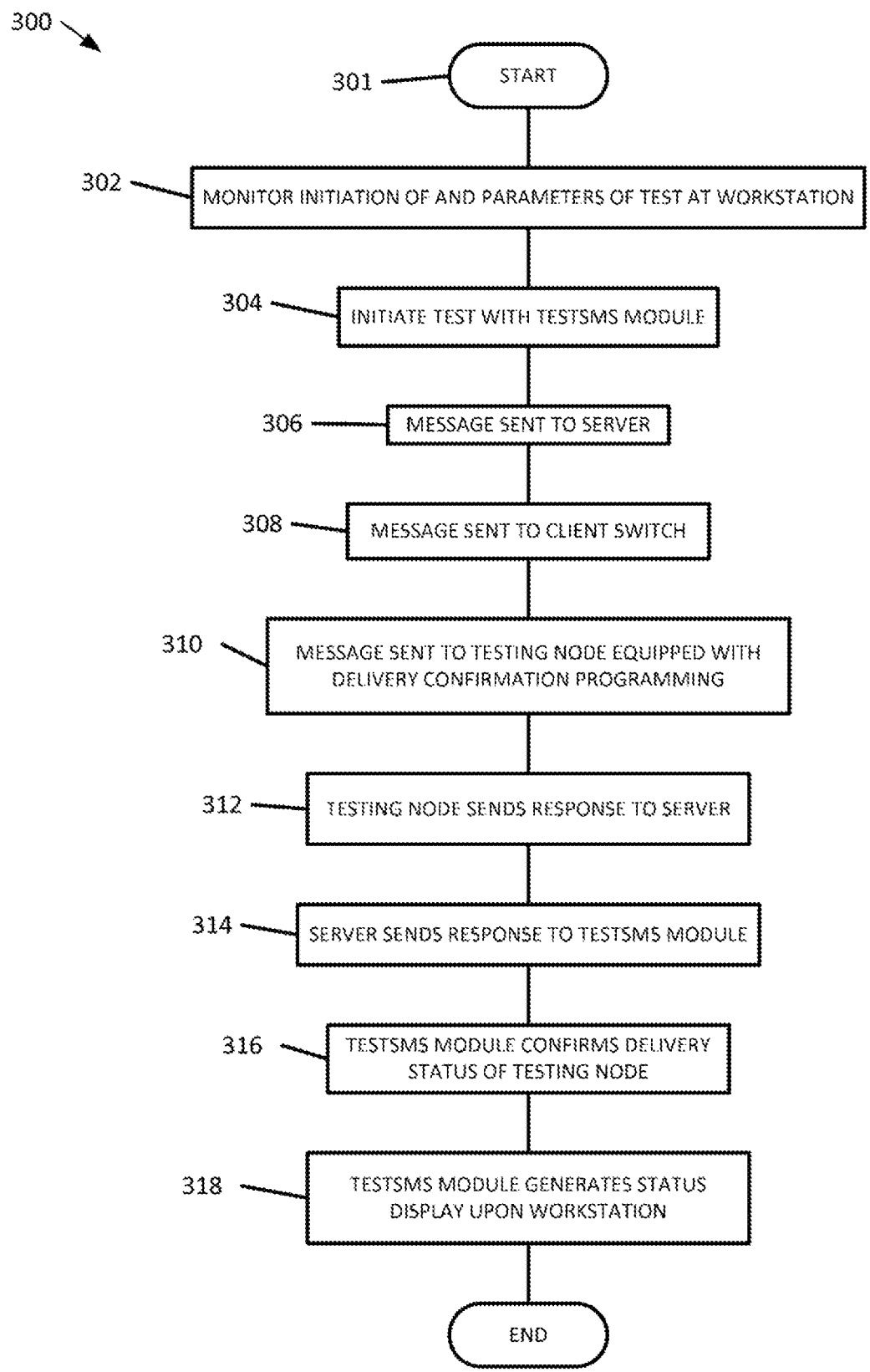
FIG. 3 illustrates an exemplary process to confirm delivery of a test message to a testing node, in accordance with the present disclosure.

FIG. 3 illustrates an exemplary process to confirm delivery of a test message to a testing node. Process 300 includes step 301 whereat the process is initiated. At step 302, the test is initiated and parameters of the test are provided by a user. At step 304, a TestSMS module configured to operate programming according to the methods disclosed herein initiates the desired test. At step 306, a message is sent to a server. At step 308, the message is sent from the server to a communications network including a client switch. At step 310, the message is delivered to a testing node equipped with programming to confirm delivery of the message. At step 312, the testing node provides a response to the server. At step 314, the server provides the response to the TestSMS module. At step 316, the TestSMS module confirms the status of the testing node and a corresponding vendor based upon the received response. At step 318, the SMS module provides an output confirming the status of testing node, for example, by generating a display upon the user's workstation. A number of processes are envisioned for sending and confirming delivery of a test message to a testing node, and the disclosure is not intended to be limited to the particular examples provided herein.

Figure 4:
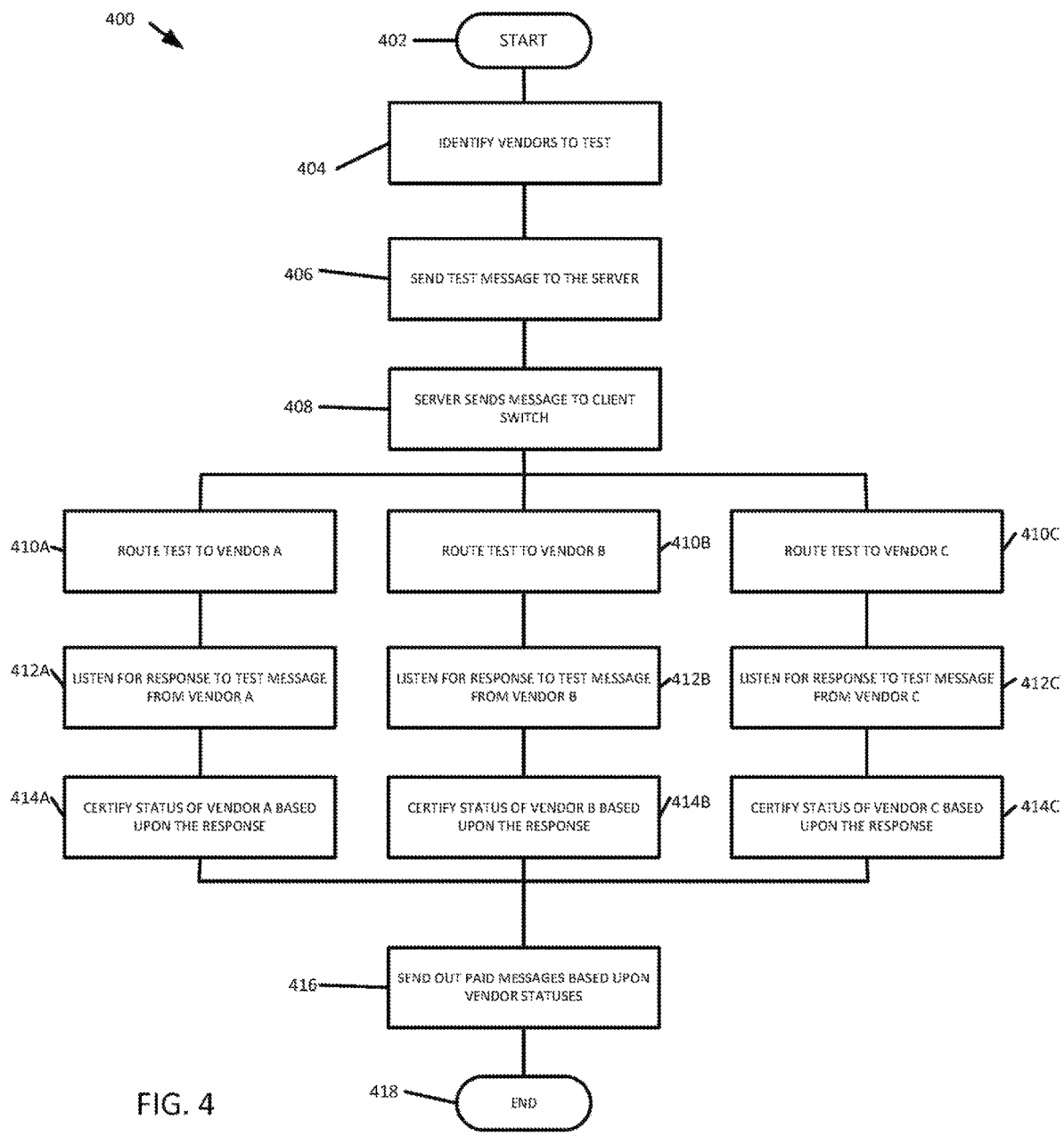
FIG. 4 illustrates an exemplary process to use test messages to confirm a status for each of a number of vendors and selectively send out messages to each of the vendors based upon the statuses, in accordance with the present disclosure.

FIG. 4 illustrates an exemplary process to use test messages to confirm a status for each of a number of vendors and selectively send out messages to each of the vendors based upon the statuses. Process 400 includes step 402 whereat the process is initiated. At step 404, a list of vendors to test is identified. At step 406, a test message is sent to a server. At step 408, the server sends the test message to a communications network including a client switch. The switch routes the message or copies of the message to each of the identified vendors. At steps 410A, 412A, and 414A, the message is routed to a first vendor which sends the message to the testing node of the mobile network to be tested, a response from a testing node is listened for, and a status of the vendor is certified based upon whether a response was received, respectively. At steps 410B, 412B, and 414B, the message is routed to a second vendor which sends the message to the testing node of the mobile network to be tested, a response from a testing node is listened for, and a status of the vendor is certified based upon whether a response was received, respectively. At steps 410C, 412C, and 414C, the message is routed to a third vendor which sends the message to the testing node of the mobile network to be tested, a response from a testing node associated with the third vendor is listened for, and a status of the vendor is certified based upon whether a response was received, respectively. At step 416, an advertising campaign including paid advertising messages is conducted promptly after the status of each vendor is certified, with messages only be sent to vendors with certified operational statuses. At step 418, the process ends. A number of processes are envisioned for using test messages to confirm vendor statuses, and the disclosure is not intended to be limited to the particular examples provided herein.

Figure 5:
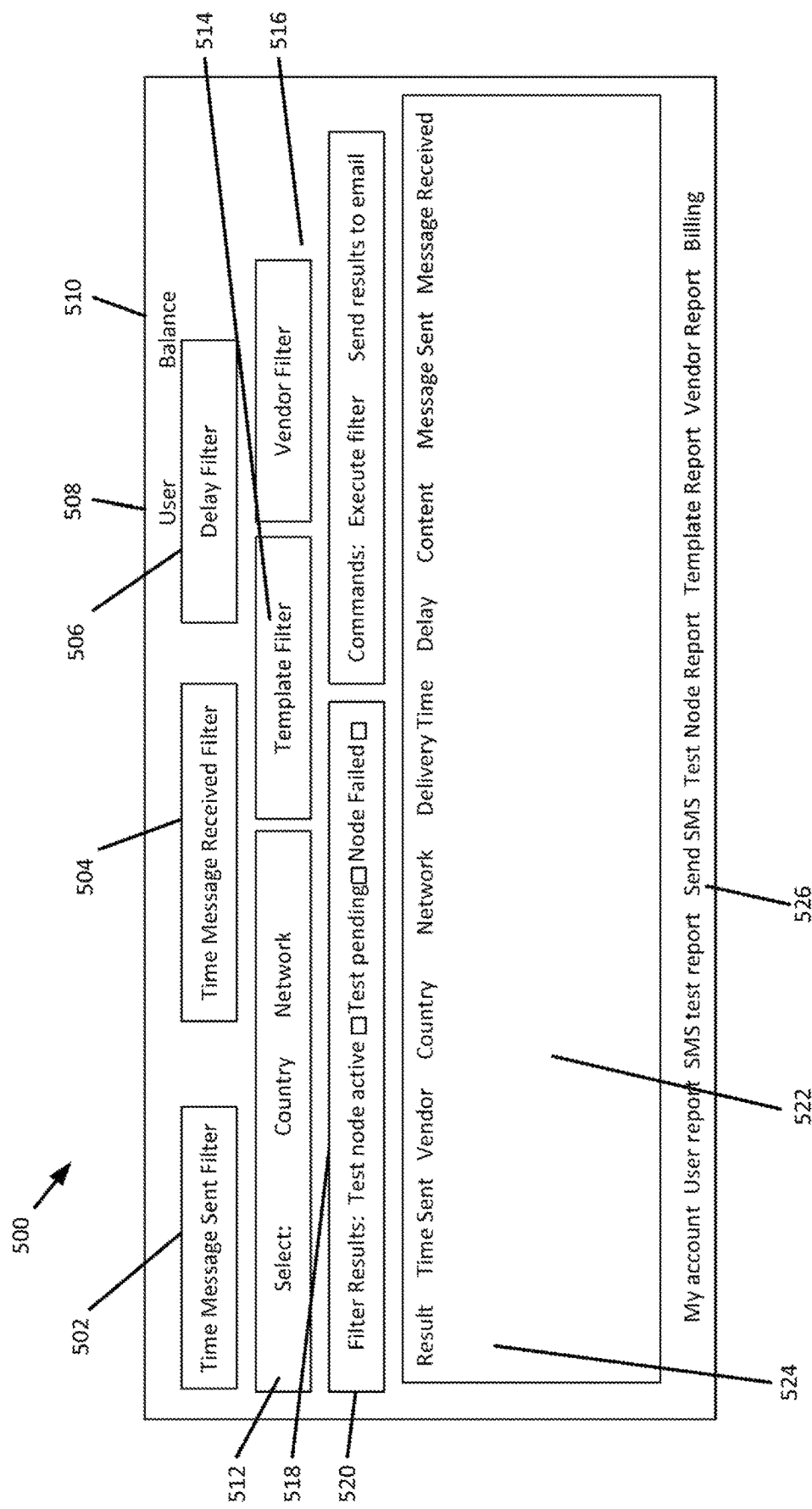
FIG. 5 illustrates an exemplary results screen that can be used to summarize test results to a user, in accordance with the present disclosure.

Results from using test messages according to the methods disclosed herein can be used, displayed, or otherwise utilized according to a number of different embodiments, for example, based upon the context of the user. A person desiring to direct an advertising campaign will need different information from a person using the methods herein to diagnostically troubleshoot a network or vendor. FIG. 5 illustrates an exemplary results screen that can be used to summarize test results to a user. Report console 500 is illustrated including a number of filters that can be used to select what information should be displayed, a set of commands that a user can execute, and an itemized list of vendors including the confirmed operational statuses of the vendors. The display can be customized to a particular user identified at 508, and a balance, for example, for a particular advertising campaign, can be identified at 510. A number of filters are presented to the user to enable efficient display of information to the user. Filter 502 permits the user to filter information according to when a test message was sent, for example, to remove old information that might not be valid anymore. Filter 504 similarly permits the user to filter information according to when a response was received from a testing node. Filter 506 permits the user to filter information according to a delay that is determined between when a test message was sent and when the response was received. Filter 512 permits the user to filter information according to a country or network. Filter 514 permits the user to filter information according to a template used for the test message. Filter 516 permits the user to filter information according to a vendor or a group of vendors. Filter 520 permits the user to filter information according to test result. Buttons included in area 518 permit the user to execute certain commands, such as executing filter selections and sending current results to an email account. Results table 522 includes information tabulated according to particular vendors. Included in the information of table 522 can be vendor specific operational statuses or test results 524 determined according to methods disclosed herein. Quick navigation links 526 can also be displayed, permitting the user to easily navigate between different display screens. A number of display elements or arrangements are envisioned for displaying results of test messages utilized according to the methods disclosed herein, and the disclosure is not intended to be limited to the examples provided herein.

The methods disclosed herein include an SMS testing platform that uses an application installed to exemplary smart phones, such as Android™ phones, Windows® Phones, or iPhones, to serve as testing nodes. Based upon current technology, Android™ phones specifically are currently adapted to enable use of methods disclosed herein, although similar methods can be used or adapted to other phones or smart phones that are or will be on the market. These methods can be employed piecemeal in individual phones set up and maintained by a vendor or an advertising company. In another embodiment, the application can be loaded on many phones in an area, region, or for a particular vendor. In another embodiment, the application can be made part of firmware for a phone or for a particular vendor, such that comprehensive analysis of a network or a vendor can be operated through sending test messages to the various phones equipped with the application. This concept allows global coverage, testing in real handsets, multiple levels of redundancy, easy expandability and minimum maintenance cost. The methods disclosed enable a global network by means of a proprietary application for phones that will be downloaded by users around the world enabling them to become actual testing nodes for SMS messages. It will be appreciated that the same methods or similar methods can be used to test voice service over a network or among a group of vendors.

Workstations, cellular devices, pagers, or any computerized device can be configured to operate portions of the disclosed processes. Exemplary computerized devices are known to include a processing device, a user interface, a communication device, and a memory device. The processing device can include memory, e.g., read only memory (ROM) and random access memory (RAM), storing processor-executable instructions and one or more processors that execute the processor-executable instructions. In embodiments where the processing device includes two or more processors, the processors can operate in a parallel or distributed manner. The processing device can execute the operating system of the computerized device.

The user interface is a device that allows a user to interact with the computerized device. The term "user interface" can include, but is not limited to, a touch screen, a physical keyboard, a mouse, a microphone, and/or a speaker. The communication device is a device that allows the computerized device to communicate with another device, e.g., a remote serve, via a communications network. The communication device can include one or more wireless transceivers for performing wireless communication and/or one or more communication ports for performing wired communication. The memory device is a device that stores data generated or received by the computerized device. The memory device can include, but is not limited to a hard disc drive, an optical disc drive, and/or a flash memory drive.

Embodiments in accordance with the present disclosure may be embodied as a device, process, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.)

Figure 6:
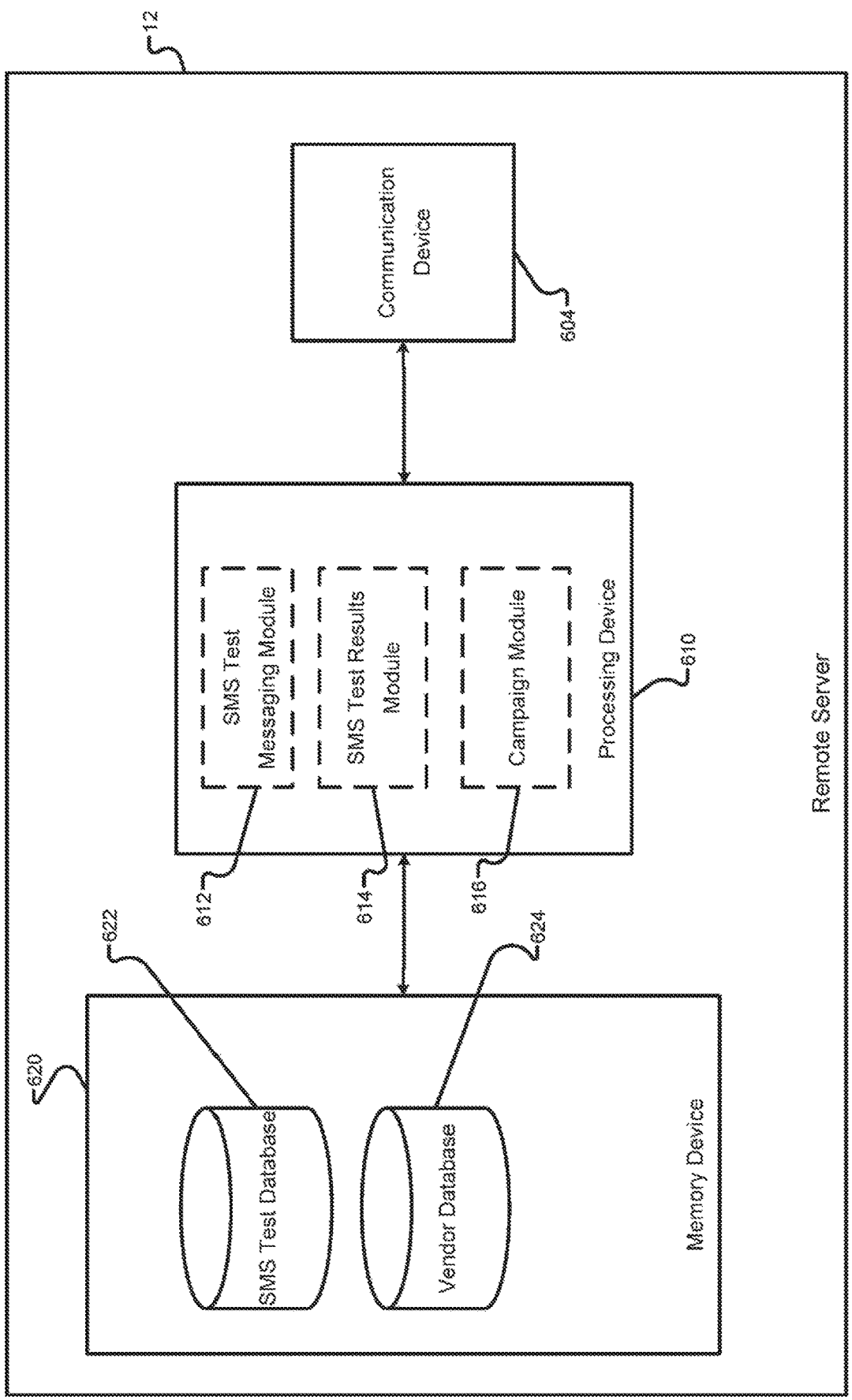
FIG. 6 illustrates operation of an exemplary server configured to operate within a TestMySMS system, according to the present disclosure.

FIG. 6 illustrates operation of an exemplary server configured to operate within a TestMySMS system. Server 12 is illustrated as a computerized device operating remotely from a user terminal and includes communication over a communications network. Server 12 includes communications device 604, processing device 610, and memory device 620. Server 12 is illustrated as a single computerized device, but it will be appreciated that server 12 could span a number of physical devices and serve the equivalent role as illustrated server 12. Server 12 monitors inputs from a user terminal regarding operation of an SMS test, operates the test including sending test SMS messages to a number of nodes or vendors, monitors the results of the test, and reports the test results to the user that initiated the test. In one embodiment, server 12 can also operate an advertising or paid message campaign based upon the test results, as disclosed herein.

Communications device 604 includes a computerized device communicating with a communications network. Communications device 604 includes communications hardware and/or software known in the art for communicating over the Internet and/or telecommunications networks. Through communications device 604, a user can issue control parameters to server 12 for a set or series of SMS test messages, server 12 can send test messages to the test nodes, server 12 can receive responses to the test messages, and server 12 can communicate and generate outputs to the user terminal.

Processing device 610 includes a computerized device known in the art including a processor and is configured to operate computer programs or applications to accomplish programmed tasks. Processing device 610 can include an operating system enabling operation of the device. Processing device can include a display or can be accessible to another device with a display enabling a technician to configure and maintain device 610. Processing device 610 can include a number of alternative computerized embodiments known in the art. The illustrated device 610 includes a plurality of program modules 612, 614, and 616 including programmed applications running processes disclosed herein. Programming can be accomplished through programming processes known in the art, and the disclosure is intended to be used with any of a number of programming methods. SMS test messaging module 612 is configured to operate an SMS test to one or more test nodes. SMS test results module 614 is configured to receive responses and record a confirmation status for each tested node. Module 614 can be further be configured to manipulate and provide any of a number of desired reports or programmed output functions based upon the test responses. Campaign module 616 can use the test response methods to send out messages, for example, the paid messages disclosed herein, based upon the test results.

Memory device 620 includes stored data useful to the operation of the disclosed processes. Exemplary device 620 includes an SMS test database 622 including data necessary to operate SMS test messages. Vendor database 624 includes data necessary to interact with the vendors/test nodes and can include historical results of test messages. Any number of databases useful to the disclosed processes can be stored within device 620.

Test results are disclosed herein being used to selectively send or distribute paid SMS messages based upon the test results confirming status of the vendors/nodes representing phone units that can be messaged at any given moment. The test results confirm in real-time how likely the messages are to be received by the phone units. Other applications besides paid messages or paid SMS advertising can be aided by real-time test results. A telemarketing campaign including a voice message or a human operator can use the test results disclosed herein to maximize a rate of connected calls. A governmental message, for example, providing storm or earthquake warnings, can use the test results to time or schedule resending alerts based upon the determined vendor/test node statuses to reach a maximum number of citizens. A test result for a particular vendor can be correlated with a message and used as evidence that a legal disclosure was provided to and received by a particular customer/user. A number of similar uses for real-time test results confirming a status of a vendor/test node are envisioned, and the disclosure is not intended to be limited to the particular examples provided herein.

Throughout the disclosure, the disclosed system is illustrated allocating marketing resources. The disclosed system improves the efficacy marketing campaigns and saves money by determining the best performing vendors/routes and providing statistics so the user can determine best cost benefit. Also, not knowing if an SMS message was delivered jeopardizes customer retention. A user can be discouraged if passwords or credit card alerts are not delivered. Such users will benefit from a system that can guarantee their messages are being monitored constantly and can ensure proper delivery in a timely manner. It also saves costs because service vendors charge is per SMS submitted and not per SMS delivered. The disclosed system will provide statistics and clearly show evidence of fake delivery avoiding paying for undelivered messages (based on performance).

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A process for determining an operational status for a cellular service vendor, the process comprising:
   in a computerized device, sending a test signal comprising
      a test message to each of a plurality of testing nodes,
      each testing node comprising a cellular device and
      being associated with a different cellular service vendor and each testing node including a computerized application configured to automatically reply and provide data back to the computerized device in reply to the test signal independently from data provided by the associated cellular service vendor;

in the computerized device, analyzing the data provided by the computerized application to determine a quality of service for each of the cellular service vendors;

in the computerized device, generating a computerized display output describing the quality of service for each of the cellular service vendors; and in the computerized device, allocating marketing resources based upon the quality of service for each of the cellular service vendors.

2. The process of claim 1, wherein determining the quality of service for each of the cellular service vendors comprises confirming successful delivery of the test message.

3. The process of claim 1, wherein determining the quality of service for each of the cellular service vendors comprises measuring a delay for delivery of the message.

4. The process of claim 1, wherein determining the quality of service for each of the cellular service vendors comprises:

monitoring a delivery report provided by each of the vendors;

comparing the delivery report to the data provided by the computerized application; and determining a fake delivery report based upon the comparing.

5. The process of claim 1, wherein determining the quality of service for each of the cellular service vendors comprises recording changes in content between the test message and actual messages delivered.

6. The process of claim 1, wherein determining the quality of service for each of the cellular service vendors comprises recording changes in sender identification between the test message and actual messages delivered.

7. The process of claim 1, wherein determining the quality of service for each of the cellular service vendors comprises identification of a short message service center.

8. A process for determining an operational status for a cellular service vendor, the process comprising:

in a computerized device, sending a test signal comprising a test message to each of a plurality of testing nodes, each testing node comprising a cellular device and being associated with a different cellular service vendor and each testing node being configured to automatically reply to the test message and provide a status confirmation independently from data provided by the associated cellular service provider;

in the computerized device, analyzing the automatic replies to certify the operational status of each of the cellular service vendors based upon the status confirmations, the operational status comprising one of operating normally and failing to operate normally;

in the computerized device, generating a computerized display output describing the operational status of each of the cellular service vendors; and in the computerized device, allocating marketing resources based upon the certifying, the allocating comprising directing paid messages only to the cellular service vendors with the operational status of operating normally.

9. The process of claim 8, wherein the allocating further comprises queuing messages to one of the cellular service vendors to be sent later based upon the status confirmation confirming that the message was not received by the testing node for the cellular service vendor.

10. The process of claim 8, wherein the allocating further comprises sending a portion of an overall budget of paid messages to be sent based upon the certifying.

11. The process of claim 8, wherein the allocating further comprises the certifying as a factor in selecting which cellular service vendors to send paid messages.

* * * * *